(12) United States Patent
Zhu et al.

(10) Patent No.: US 10,534,364 B2
(45) Date of Patent: Jan. 14, 2020

(54) METHOD AND SYSTEM FOR AUTONOMOUS VEHICLE SPEED FOLLOWING

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Qi Kong, Sunnyvale, CA (US); Xiang Yu, Sunnyvale, CA (US); Sen Hu, Sunnyvale, CA (US); Qi Luo, Sunnyvale, CA (US); Zhenguang Zhu, Beijing (CN); Yuchang Pan, Beijing (CN); Wenli Yang, Beijing (CN); Guang Yang, San Jose, CA (US); Jingao Wang, Saratoga, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 185 days.

(21) Appl. No.: 15/313,523

(22) PCT Filed: Nov. 17, 2016

(86) PCT No.: PCT/CN2016/106249
§ 371 (c)(1),
(2) Date: Nov. 22, 2016

(87) PCT Pub. No.: WO2018/090289
PCT Pub. Date: May 24, 2018

(65) Prior Publication Data
US 2018/0196440 A1 Jul. 12, 2018

(51) Int. Cl.
G05D 1/02 (2006.01)
G05D 1/00 (2006.01)
B60W 40/02 (2006.01)

(52) U.S. Cl.
CPC .......... G05D 1/0223 (2013.01); B60W 40/02 (2013.01); G05D 1/0088 (2013.01); B60W 2520/403 (2013.01)

(58) Field of Classification Search
CPC .............. G05D 1/0223; G05D 1/0088; B60W 2520/403; B60W 40/02
(Continued)

(56) References Cited

U.S. PATENT DOCUMENTS

2010/0049400 A1* 2/2010 Duraiswamy ....... B60W 30/143
701/33.4
2010/0250083 A1* 9/2010 Takahashi ............. B60T 8/1755
701/70

(Continued)

Primary Examiner — Khoi H Tran
Assistant Examiner — Rodney P King
(74) Attorney, Agent, or Firm — Womble Bond Dickinson (US) LLP

(57) ABSTRACT

In one embodiment, an autonomous driving vehicle (ADV) speed following system determines how much and when to apply a throttle or a brake control of an ADV to maneuver the ADV around, or to avoid, obstacles of a planned route. The speed following system calculates a first torque force to accelerate the ADV, a second torque force to counteract frictional forces and wind resistances to maintain a reference speed, and a third torque force to minimize an initial difference and external disturbances thereafter between predefined target speed and actual speed of the ADV over a planned route. The speed following system determines a throttle-brake torque force based on the first, second, and third torque forces and utilizes the throttle-brake torque force to control a subsequent speed of the ADV.

21 Claims, 13 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2014/0214298 A1* | 7/2014 | Pita-Gil | B60L 7/18 |
| | | | 701/70 |
| 2014/0277988 A1* | 9/2014 | Franganillo | B60K 31/00 |
| | | | 701/93 |
| 2015/0330503 A1* | 11/2015 | Sujan | F16H 61/16 |
| | | | 701/55 |

* cited by examiner

METHOD AND SYSTEM FOR AUTONOMOUS VEHICLE SPEED FOLLOWING

TECHNICAL FIELD

Embodiments of the present invention relate generally to operating autonomous vehicles. More particularly, embodiments of the invention relate to determination of a torque or rotational force required for control the speed of an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Speed control (throttle and brake control) is a critical operation in autonomous driving. Autonomous vehicles are required to apply a throttle control or a brake control to maneuver the autonomous vehicles around or to avoid obstacles autonomously following a planned route. A planned route may include speeding up, slowing down, or maintaining a reference speed from a starting location to a target location. However, because vehicular speed control is a delay system, i.e., the mechanical features of an autonomous vehicle responds with a time delay, and there are external factors such as, frictional force, wind resistances, steepness of the road, and initial errors, it may be a challenge to command an autonomous vehicle to follow a target reference speed while minimizing a difference between a target speed and an actual speed of the autonomous vehicle, also referred to as an autonomous driving vehicle or ADV.

SUMMARY

Embodiments of the present disclosure provide a computer-implemented method for controlling a speed of an autonomous vehicle, a non-transitory machine-readable medium, and a data processing system.

In an aspect of the disclosure, the computer-implemented method for controlling a speed of an autonomous vehicle comprises: calculating a first torque force for accelerating the autonomous vehicle to maneuver the autonomous vehicle; calculating a second torque force for maintaining a constant speed of the autonomous vehicle; determining a throttle-brake torque force based on the first torque force and second torque force; and controlling a subsequent speed of the autonomous vehicle based on the throttle-brake torque force.

In another aspect of the disclosure, the non-transitory machine-readable medium has instructions stored therein, which when executed by a processor, cause the processor to perform operations of operating an autonomous vehicle, the operations comprising: calculating a first torque force for accelerating the autonomous vehicle to maneuver the autonomous vehicle; calculating a second torque force for maintaining a constant speed of the autonomous vehicle; determining a throttle-brake torque force based on the first torque force and second torque force; and controlling a subsequent speed of the autonomous vehicle based on the throttle-brake torque force.

In a further aspect of the disclosure, the data processing system comprises: a processor; and a memory coupled to the processor to store instructions, which when executed by the processor, cause the processor to perform operations of operating an autonomous vehicle, the operations including: calculating a first torque force for accelerating the autonomous vehicle to maneuver the autonomous vehicle, calculating a second torque force for maintaining a constant speed of the autonomous vehicle, determining a throttle-brake torque force based on the first torque force and second torque force, and controlling a subsequent speed of the autonomous vehicle based on the throttle-brake torque force.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
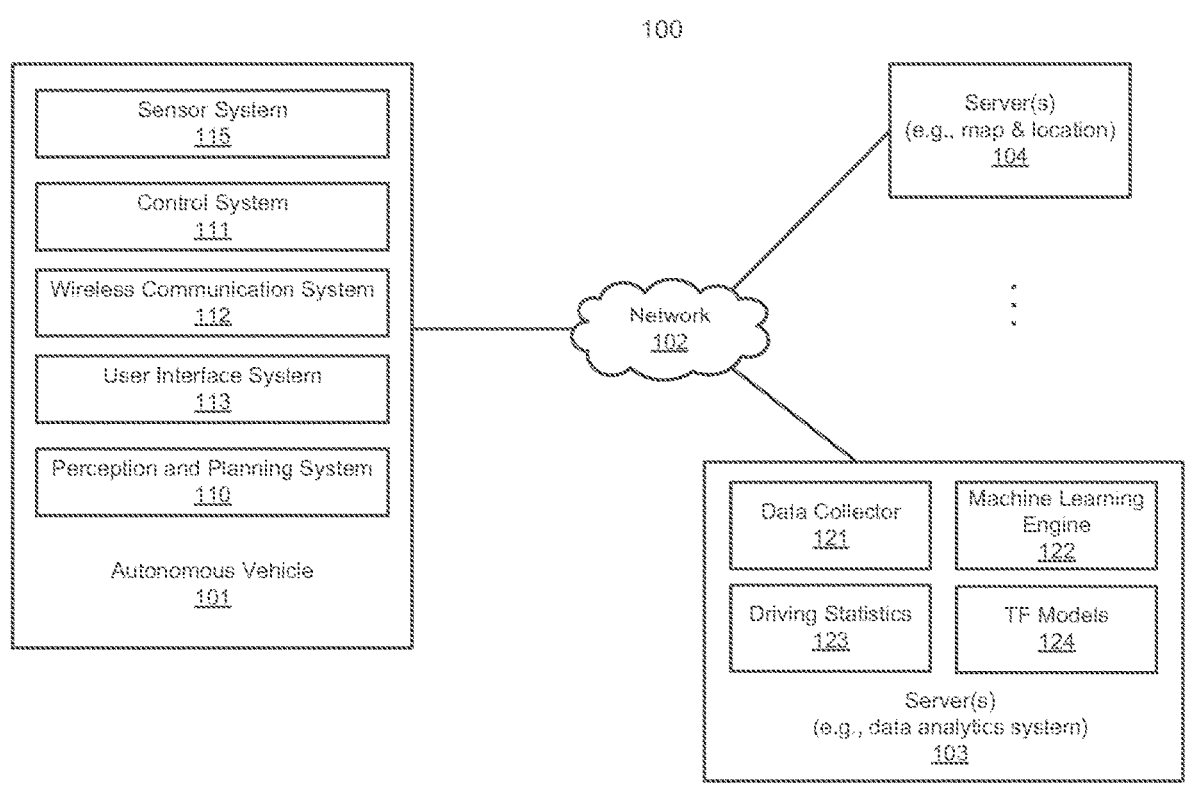
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Reference in the specification to "torque force" (TF) means torque or rotational force.

According to some embodiments, a control module of a perception and planning system determines how much and when to apply a throttle or a brake control of an autonomous driving vehicle (ADV) to maneuver the ADV around, or to avoid, obstacles of a planned route. The planned route may include speeding up, slowing down, or maintaining a reference speed.

In one embodiment, a control module calculates a first torque force for accelerating the autonomous vehicle to maneuver the autonomous vehicle, a second torque force to maintain a reference speed, e.g., to counteract wind resistance and frictional forces, and a third torque force to minimize the initial difference in the vehicular speed and disturbances external to the ADV that affect the vehicular speed, such as travelling on a steep hill. The speed control system determines a throttle control or brake control (throttle-brake) torque force based on the first, second, and third torque force and controls a subsequent speed of the ADV based on the calculated throttle-brake torque force.

In one embodiment, the first torque force is calculated by determining a first target speed of the ADV to maneuver the ADV at a first reference time, determining a second target speed of the ADV to maneuver the ADV at a second reference time, and calculating an acceleration torque force as the first torque force based on the first and second target speeds in view of a mechanical command delay in observing an actual speed output from the time a control command is issued. In another embodiment, the command delay is different for an ADV applying an acceleration control than a brake control. In one embodiment, the first torque force is calculated by taking the difference between the first determined target speed and the second determined target speed and divided by the difference between the first reference time and the second reference time.

In one embodiment, the second torque force is calculated by determining a current speed of the ADV, determining a frictional force acting on the ADV, determining a wind resistance acting on the ADV, and calculating a torque force for a reference time frame to be applied to maintain a steady speed based on the current speed of the ADV, the frictional force, and the wind resistance. In another embodiment, the wind resistance is determined based on a second order of the current speed of the ADV, and the frictional force is determined based on a first order of the current speed of the ADV.

In one embodiment, the third torque force is calculated by determining a target speed of an ADV, determining an actual speed of the ADV, calculating an initial offset in speed and any external disturbances of the ADV (such as, driving on a steep hill) based on the target speed and the actual speed using a proportional-integral-derivative (PID) controller. In another embodiment, the throttle-brake torque force is calculated by summing up the first, second, and third torque forces.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
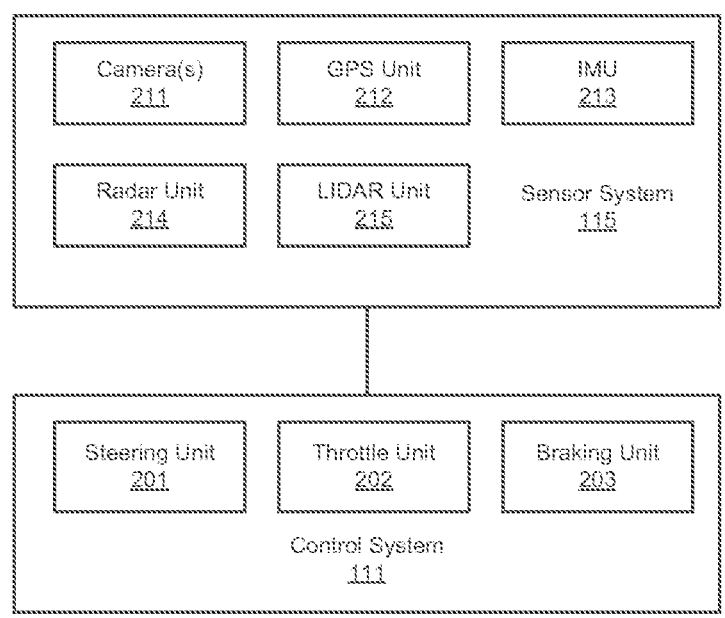
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

According to one embodiment, the throttle control or brake control torque force of an autonomous driving vehicle (ADV) can be determined from a torque force (TF) model composed of three torque forces. The system calculates a first torque force for accelerating an autonomous vehicle, a second torque force to maintain a constant speed, and a third torque force to minimize the speed difference between the target speed and an actual speed of the vehicle. The system determines a throttle-brake torque force based on the first, second, and third torque forces. The system controls a subsequent speed of the autonomous vehicle based on the throttle-brake torque force.

In one embodiment, the first torque force is calculated by determining a first target speed of the ADV at a first reference time, determining a second target speed at a second reference time, and calculating an acceleration torque force based on the first and second target speeds taking into account that the actual speed will have a mechanical command delay from the time when the throttle control command is executed. In another embodiment, the command delay is different for acceleration, e.g., the throttle control, than for deceleration, e.g., the brake control. In another embodiment, the acceleration torque force is calculated by taking the difference between the first target speed and second target speed, divide by, the difference between the first reference time and the second reference time.

In one embodiment, the second torque force is calculated by determining a current speed of the ADV, determining a frictional force acting on the ADV, determining a wind resistance acting on the ADV, and calculating a torque force required to maintain a constant speed based on the current speed of the ADV, the determined frictional force, and the wind resistance.

In one embodiment, the wind resistance acting on the ADV is determined based on a second order of the current speed of the ADV. The frictional force acting on the ADV is determined based on a first order of the current speed of the ADV.

In one embodiment, the system calculates the third torque force by determining a target speed of the ADV, determining an actual speed of the ADV, and calculating a torque force to be applied to the ADV to minimize the difference between the target speed and the actual speed using a proportional-integral-derivative (PID) controller. In another embodiment, the throttle-brake torque force is calculated by summing the first, the second, and the third torque forces.

In one embodiment, the frictional forces and wind resistances can be modeled by coefficients proportional to the first order and second order of the current speed of the ADV, respectively. The PID controller may be modeled by proportional, integral, and derivative coefficients. These coefficients may be configured offline by a data analytics system based on a large amount of driving statistics, such as, for example data analytics system or server 103.

In one embodiment, data analytics system 103 includes data collector 121 and machine-learning engine 122. Data collector 121 collects driving statistics 123 from a variety of vehicles. Driving statistics 123 may include information concerning the target and actual speeds of the ADV, GPS locations with reference to time, the brand/model of the ADV, the vehicular identification number, planned routes, and sensor outputs of the driving environment such as the weather and road conditions. Machine learning engine 122 analyzes driving statistics 123 to learn and determine the suitable coefficients for the TF model 124 to represent frictional forces, wind resistances, and a stable PID controller response. The TF model 124 can then be uploaded onto perception and planning system 110 of autonomous vehicle 101 to be utilized for decisions of speed control.

Figure 3:
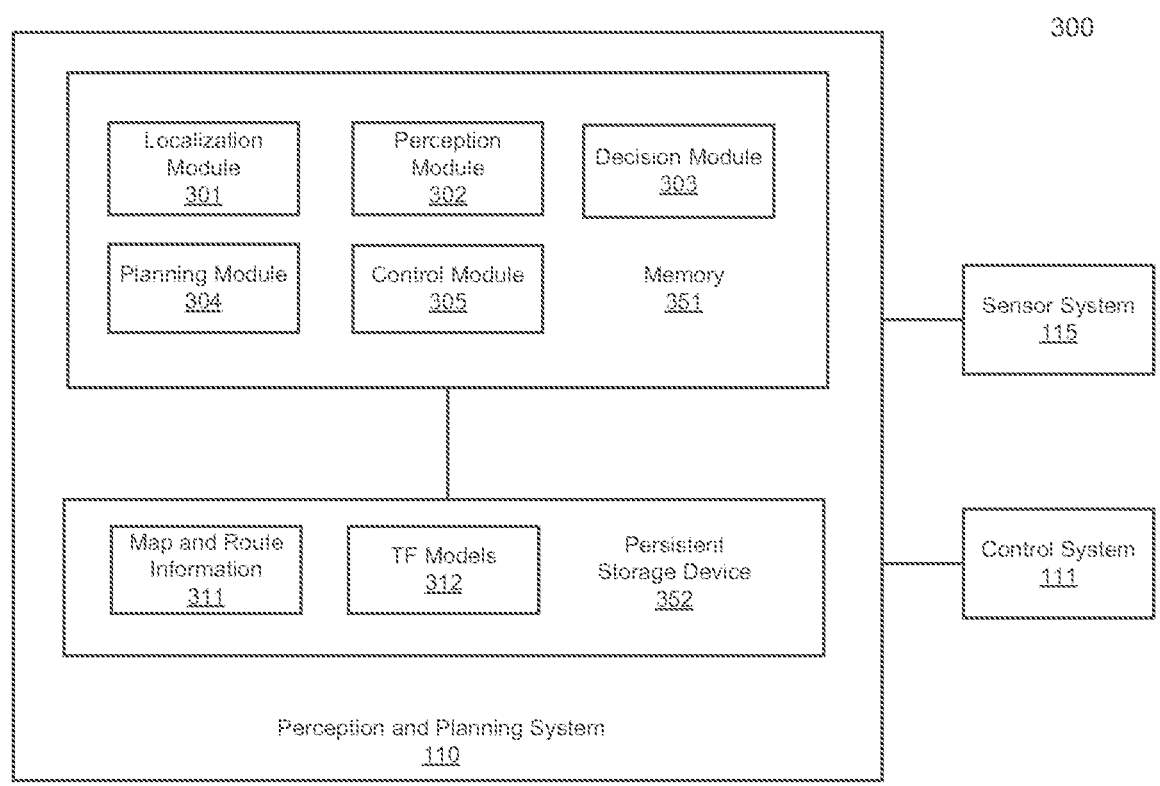
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-305 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
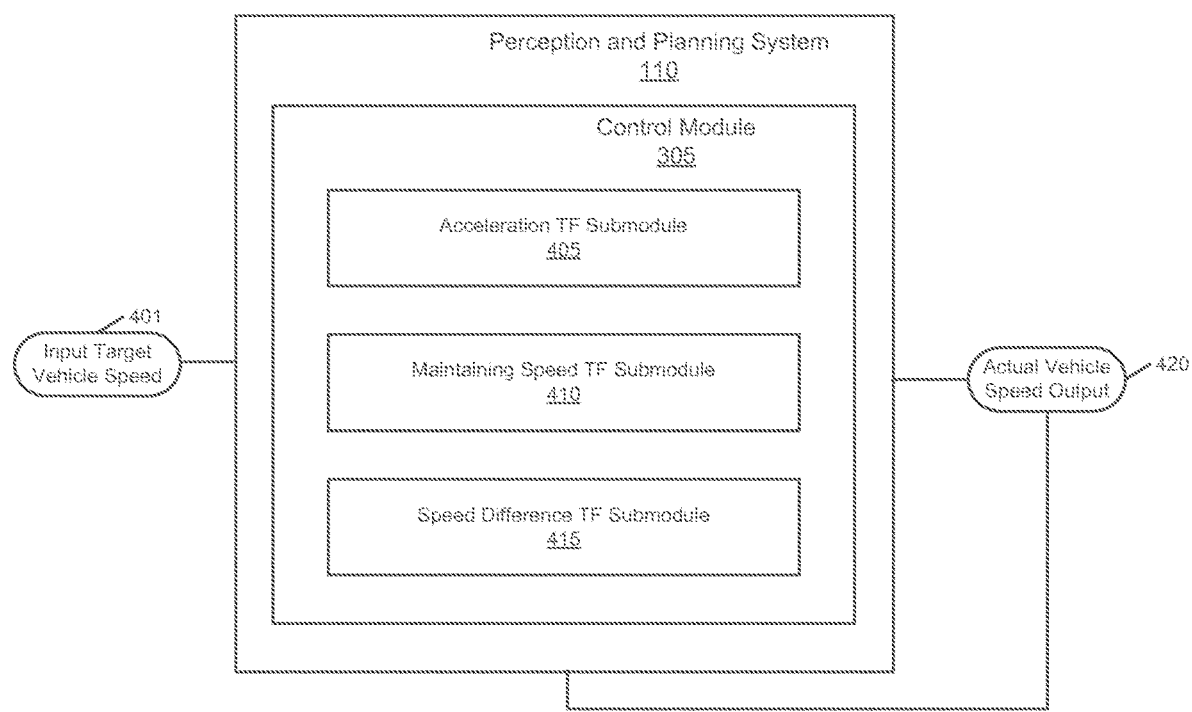
FIG. 4 is a block diagram illustrating an example of a control module of a perception and planning system according to one embodiment of the invention.

FIG. 4 illustrates a control module 305 according to one embodiment. The control module 305 includes an acceleration TF submodule 405, a maintaining speed TF submodule 410, and a speed difference TF submodule 415. These modules are responsible for calculating the first torque force $(TF_{acc})$ for accelerating the autonomous vehicle, the second torque force $(TF_m)$ to maintain a constant speed, and the third torque force $(TF_{diff})$ to minimize the speed differences between an target speed and an actual speed of the vehicle, respectively. The input to all three modules includes the input target vehicular speed 401. The output is the throttle-brake commands sent by the control system 111 and the eventual actual vehicular speed 420. The actual vehicular speed 420 is fed back to the control module 305, for example, as the second input for the speed difference TF submodule 415, for example, for the next command cycle.

Figure 5:
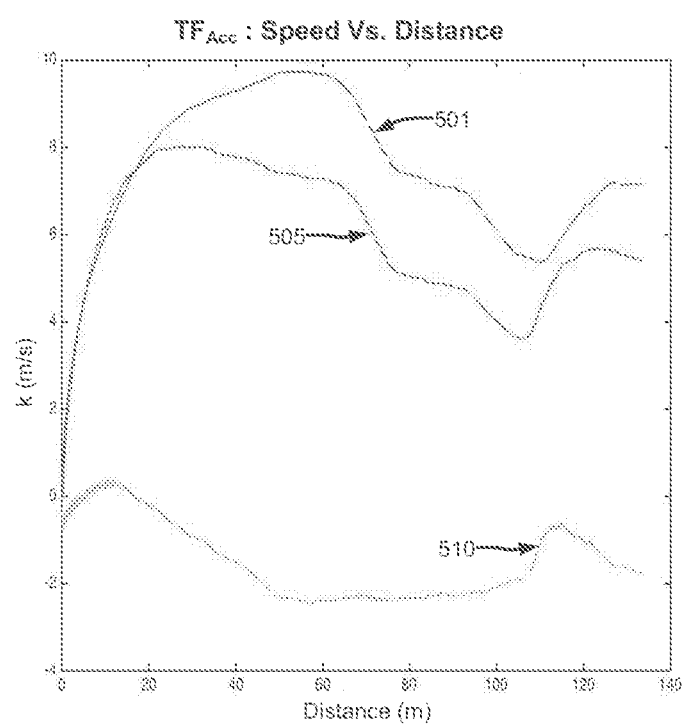
FIG. 5 is a graph of target speed, actual speed, and the difference between the target and actual speed in meter/second versus distance travelled for an autonomous vehicle applying $TF_{ACC}$ according to one embodiment of the invention.

The acceleration TF submodule 405 calculates the acceleration torque force required to add or subtract to the current speed of an ADV. FIG. 5 is a speed versus distance graph for TF models 312 representative of the acceleration torque force, according to one embodiment. Referring to FIG. 5, the graph shows a target speed 501, an actual speed 505 and the deviation, or speed difference 510 of an ADV. The acceleration torque force is calculated based on two points on the target speed 501 in view of a command delay. For example, if it is determined a throttle control command is to be applied, the acceleration TF submodule 405 determines the command delay of the throttle control, a first target speed in view of the throttle command delay (i.e., what a first target speed would be after the command delay) and a second target speed in view of the throttle command delay (i.e., what a second (or subsequent) target speed would be after the command delay). The acceleration TF submodule 405 calculates the torque or rotational force required to speed up the ADV by taking a derivative of the target speed in view of the command delay with respect to time. The derivative can be calculate based on the delta of, or a change in, the first and second target speeds, divided by the delta of a first and a second time, respectively, as follows:

$$\text{E.g., acceleration} = \frac{dk}{dt} = \frac{\Delta k}{\Delta t} = \frac{k_2 - k_1}{t_2 - t_1};$$

where k represents speed and t represents time. Given an ADV with a constant mass and wheel radius, the torque or rotational force (TF) is proportional to the acceleration, e.g., a TF models 312 representative of $TF_{acc}$ may be:

$$TF_{acc} \propto \frac{dk}{dt} = \frac{\Delta k}{\Delta t} = \frac{k_2 - k_1}{t_2 - t_1},$$

in view of a throttle command delay. The torque or rotational force is converted into a throttle command based on a mathematical model of the throttle command. An example throttle command may be:

$$CMD_{throttle}(t) = \frac{TF_{acc}(t+c)}{a} \times e^b,$$

according to one embodiment. In one embodiment, a is approximately 8.5, b is approximately −0.63, and c is an estimated throttle control command delay. In one embodiment, c is approximately 1.0 for a throttle control with a command delay of one second.

In another example, if it is determined a brake control is to be applied, the acceleration TF submodule 405 determines the command delay of the brake control, a first target speed in view of the brake command delay, a second target speed (or subsequent target speed after applying the brake control) in view of the brake command delay to determine the required torque or rotational force required to subtract speed from the ADV. The torque or rotational force is converted into a brake command based on a mathematical model of the brake command. An example brake control command may be: brake command may be:

$$CMD_{brake}(t) = \frac{TF_{acc}(t+c)}{a} \times e^b,$$

according to one embodiment. In one embodiment, a is approximately 40.0, b is approximately −0.1, and c is an estimated brake control command delay. In one embodiment, c is approximately 0.2 for a brake control with a command delay of 0.2 seconds.

While a TF Models 312 representative of an acceleration torque force handles acceleration and deceleration, an ADV speed gradually reduces due to wind resistances and frictional forces. See FIG. 5 (the speed difference 510 varies by about 2 meters/second). TF Models 312 representative of an acceleration torque force and a maintaining speed torque force prevents gradual speed reduction. The maintaining speed torque force corresponds to a driver periodically applying a throttle control to maintain a steady speed of a vehicle.

Figure 6:
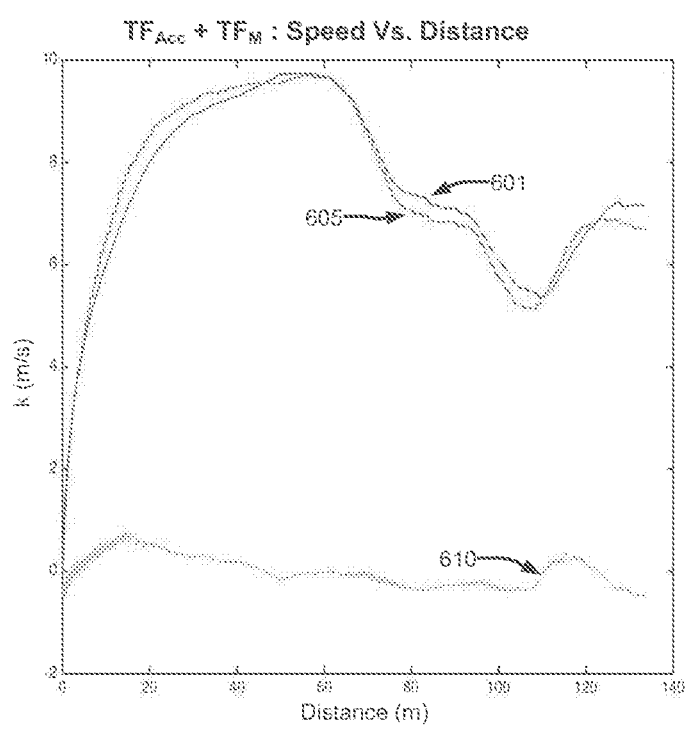
FIG. 6 is a graph of target speed, actual speed, and the difference between the target and actual speed in meter/second versus distance travelled for an autonomous vehicle applying $TF_{ACC}+TF_M$ according to one embodiment of the invention.

FIG. 6 is a speed versus distance graph for TF models 312 that contains an acceleration torque force and a maintaining speed torque force, according to one embodiment. The acceleration torque force is calculated by an acceleration TF submodule 405 as described above. A maintaining speed TF submodule 410 calculates a torque or rotational force required to maintain a steady speed of an ADV, such as, to counter wind resistance and frictional force (e.g., internal mechanical friction). FIG. 6 shows a target speed 601, an actual speed 605, and a deviation between the target speed 601 and the actual speed 605, or speed difference 610, of an ADV. As shown, the speed difference 610 varies by a margin of less than one meter/second.

In one embodiment, the torque or rotational force required to maintain a steady speed of an ADV may be calculated by determining the current speed of the autonomous vehicle, the frictional force acting on the ADV, and the wind resistance acting on the ADV. The frictional force and wind resistance may be calculated by a control module 305 of a perception and planning system 110 of a autonomous vehicle 101 based on the most recent gathered data. For example, the frictional force and wind resistance may be calculated based on TF models 312 having the mathematical equation: $TF_M \propto \theta \times k^2 + \lambda(k+k_s)$, where k is the current speed of the ADV, $\theta$ is a constant representative of wind resistances, $\lambda$ and $k_s$ are constants representative of frictional forces acting on the ADV. $\theta$, $\lambda$, and $k_s$ may be previously calculated offline by the data analytics system 103. In one embodiment, $\theta$, $\lambda$, and $k_s$ are shared across similar vehicle brands/models. In another embodiment, $\theta$, $\lambda$, and $k_s$ may be specific to a particular vehicle or a particular type of vehicles.

Figure 7A:
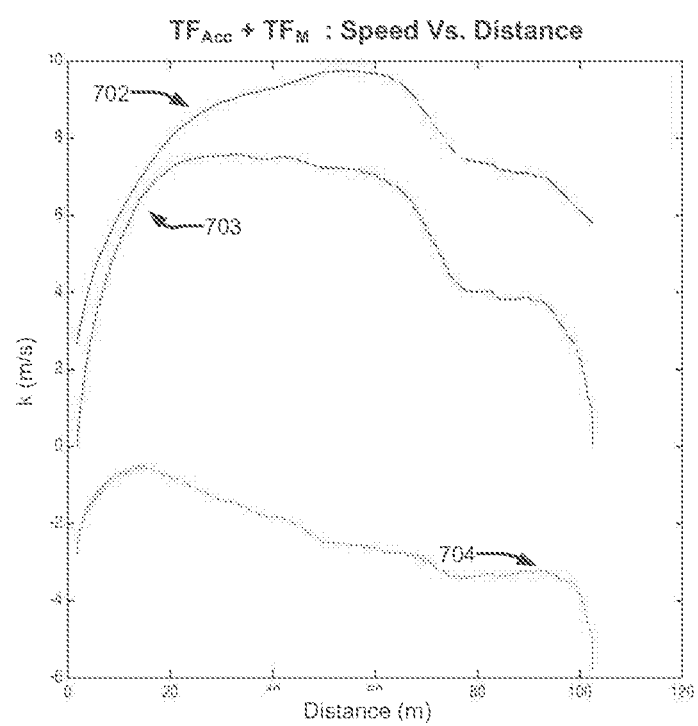
FIG. 7A is a graph of target speed, actual speed, and the difference between the target and actual speed in meter/second versus distance travelled for an autonomous vehicle applying $TF_{ACC}+TF_M$ with an initial speed deviation according to one embodiment of the invention.

FIG. 7A is a speed versus distance graph for TF models 312 that contains an acceleration torque force and a maintenance torque force with an initial speed deviation of 3 meters/second, according to one embodiment. In this example as shown in FIG. 7A, the total TF is calculated based on $TF_{acc}$ and $TF_m$. As show, the initial speed deviation remains in the speed difference 704 throughout the travel. While a TF Models 312 representative of an acceleration torque force and a maintaining speed torque force handles acceleration and deceleration and prevents gradual speed reduction, it does not cope with an initial speed deviation (speed difference/initial error) between the actual and target speeds. A TF Models 312 with an initial error reduction torque force, e.g., a closed loop control would minimize this initial speed deviation.

Figure 7B:
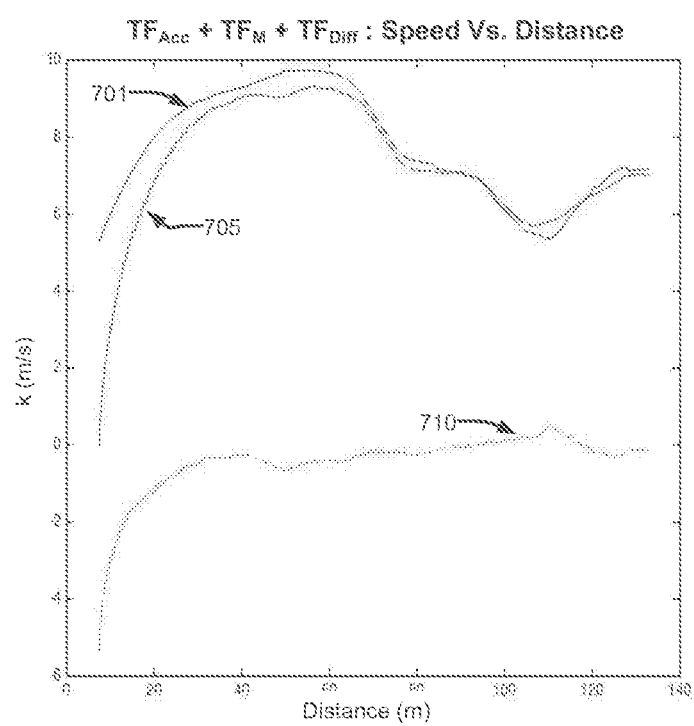
FIG. 7B is a graph of target speed, actual speed, and the difference between the target and actual speed in meter/second versus distance travelled for an autonomous vehicle applying $TF_{ACC}+TF_M+TF_{DIFF}$ with an initial speed deviation according to one embodiment of the invention.

FIG. 7B is a speed versus distance graph for TF models 312 that contains an acceleration torque force, a maintenance torque force, and an initial error reduction torque force with an initial speed deviation of five meter/second, according to one embodiment. The acceleration torque force and maintaining speed torque force are calculated by an acceleration TF submodule 405 and a maintaining speed TF submodule 410 respectively as described above. An error reduction TF submodule 410 calculates the torque force required to correct for any initial deviation in speed and external disturbances. FIG. 7B shows a target speed 701, an actual speed 705, and a speed deviation between the target and actual speed, or speed difference 710 of an ADV. As shown, the ADV has an initial speed deviation 710 of about five meter/second. The actual speed 705 of the ADV eventually follows the target speed 701 by a margin of less than one meter/second after the ADV travelled roughly 30 meters.

In one embodiment, the error reduction torque force may be calculated using a proportional-integral-derivative (PID) controller. A PID controller is a control loop feedback mechanism commonly used in industrial control systems. A PID controller continuously calculates an error value as the difference between a target value and an actual value and applies a correction based on proportional, integral, and derivative terms, denoted as P, I, and D respectively. For example, the TF models 312 may include the mathematical equation for an initial error reduction torque force:

$$TF_{Diff} \propto P + I + D = K_p e(t) + K_i \int_0^t e(t)dt + K_d \frac{de(t)}{dt};$$

where $e(t) = k_{target} - k_{actual}$ is the initial error or the difference between a target and an actual speed to be reduced, $K_p$, $K_i$, and $K_d$ are the proportional, integral, and derivative constants of the PID controller. At the outset, the constants $K_p$, $K_i$, and $K_d$ of the PID controller has to be trained or tuned. In one embodiment, the PID constants may be tuned offline by machine learning engine 122, based on a large set of driving statistics 123 at the data analytics system 103. In another embodiment, the PID constants may be adjusted during operation of the ADV by a control module 305 of perception and planning system 110. In one embodiment, the PID controller may be an implemented by an analog hardware device. In another embodiment, the PID controller may be implemented by a software program.

Figure 8:
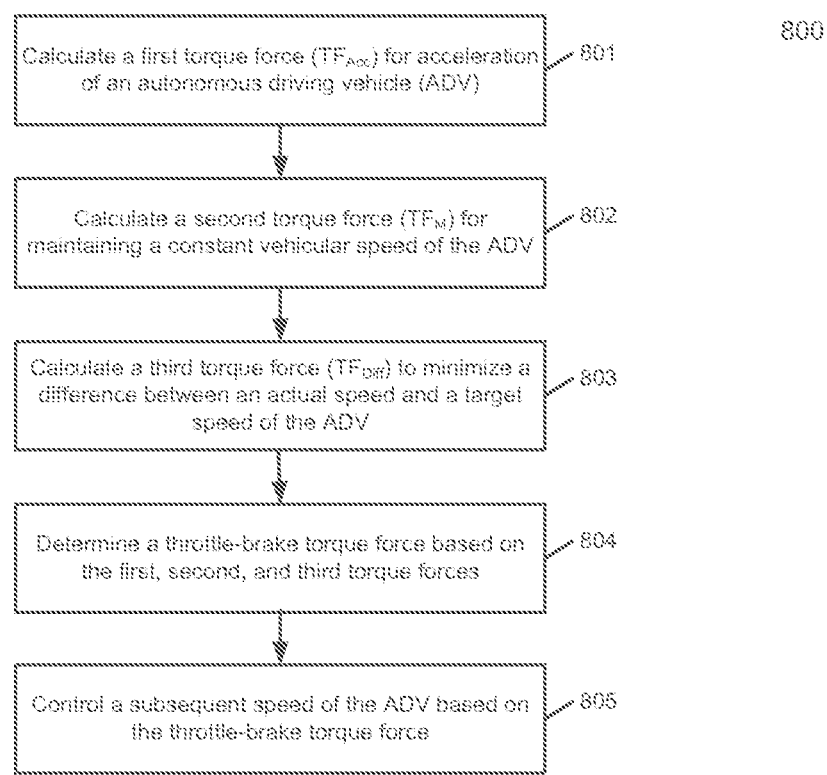
FIG. 8 is a flow diagram illustrating the process method to calculate a throttle-brake torque or rotational force (TF) to control the speed of an autonomous driving vehicle (ADV) according to one embodiment of the invention.

FIG. 8 is a flow diagram illustrating a process to calculate the throttle-brake torque force according to one embodiment. Process 800 may be performed by processing logic which may include software, hardware, or a combination thereof. For example, process 800 may be performed by a control module of an autonomous vehicle, such as control module 305 of perception and planning system 110. Referring to FIG. 8, at block 801, processing logic calculates a first torque force for acceleration of an autonomous vehicle (ADV). At block 802, processing logic calculates a second torque force to maintain a constant vehicular speed of the ADV. At block 803, processing logic calculates a third torque force to minimize a difference between the actual speed and a target speed of the ADV. At block 804, processing logic determines a throttle-brake torque force based on the first, second, and third torque forces. At block 805, control module 305 of the perception and planning system 110 controls a subsequent speed of the ADV based on the throttle-brake torque force.

Figure 9:
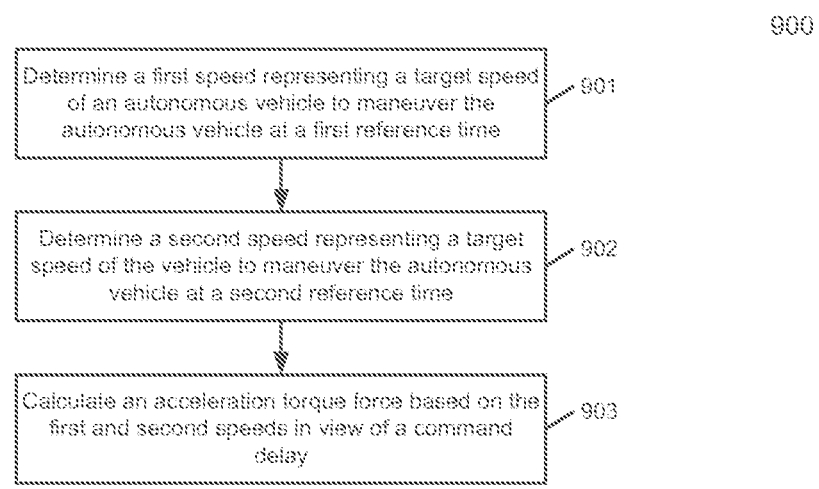
FIG. 9 is a flow diagram illustrating the process to calculate an acceleration torque or rotational force ($TF_{ACC}$) of an ADV according to one embodiment of the invention.

FIG. 9 is a flow diagram illustrating a process to calculate the first torque force of block 801 according to one embodiment. Process 900 may be performed by processing logic which may include software, hardware, or a combination thereof. For example, process 900 may be performed by a control module of an autonomous vehicle, such as control module 305 of perception and planning system 110. Referring to FIG. 9, at block 901, processing logic determines a first speed representing a target speed of an autonomous vehicle to maneuver the autonomous vehicle at a first reference time. At block 902, processing logic determines a second speed representing a target speed of an autonomous vehicle to maneuver the autonomous vehicle at a second reference time. At block 903, processing logic calculates an acceleration torque force based on the first and second speeds in view of a command delay.

Figure 10:
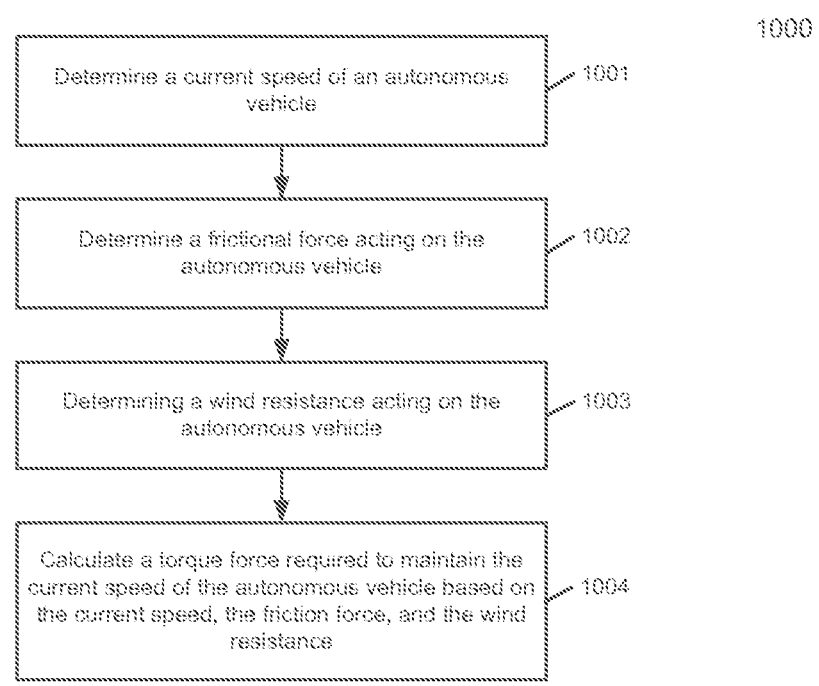
FIG. 10 is a flow diagram illustrating the process to calculate a maintenance torque or rotational force ($TF_M$) to overcome frictional force and wind resistance of an ADV according to one embodiment of the invention.

FIG. 10 is a flow diagram illustrating a process to calculate the second torque force of block 802 according to one embodiment. Process 1000 may be performed by processing logic which may include software, hardware, or a combination thereof. For example, process 1000 may be performed by a control module of an autonomous vehicle, such as control module 305 of perception and planning system 110. Referring to FIG. 10, at block 1001, processing logic determines a current speed of an autonomous vehicle. At block 1002, processing logic determines frictional forces acting on the autonomous vehicle. At block 103, process logic determines a wind resistance acting on the autonomous vehicle. At block 104, process logic calculates a torque force required to maintain the current speed of the autonomous vehicle based on the current speed, the friction force, and the wind resistance.

Figure 11:
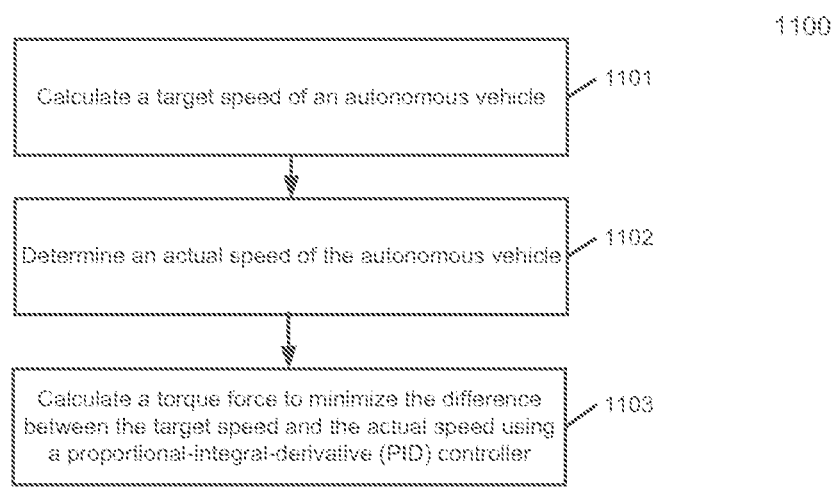
FIG. 11 is a flow diagram illustrating the process to calculate a torque or rotational force ($TF_{DIFF}$) to minimize outside disturbance and initial error, e.g., the speed difference between an actual and target speed, of an ADV according to one embodiment of the invention.

FIG. 11 is a flow diagram illustrating a process to calculate the third torque force of block 803 according to one embodiment. Process 1100 may be performed by processing logic which may include software, hardware, or a combination thereof. For example, process 1100 may be performed by a control module of an autonomous vehicle, such as control module 305 of perception and planning system 110. Referring to FIG. 11, at block 1101, processing logic calculates a target speed of an autonomous vehicle. At block 1102, processing logic determine an actual speed of the autonomous vehicle. At block 1103, processing logic calculates a torque force to minimize the difference between the target speed and the actual speed using a proportional-integral-derivative (PID) controller.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 12:
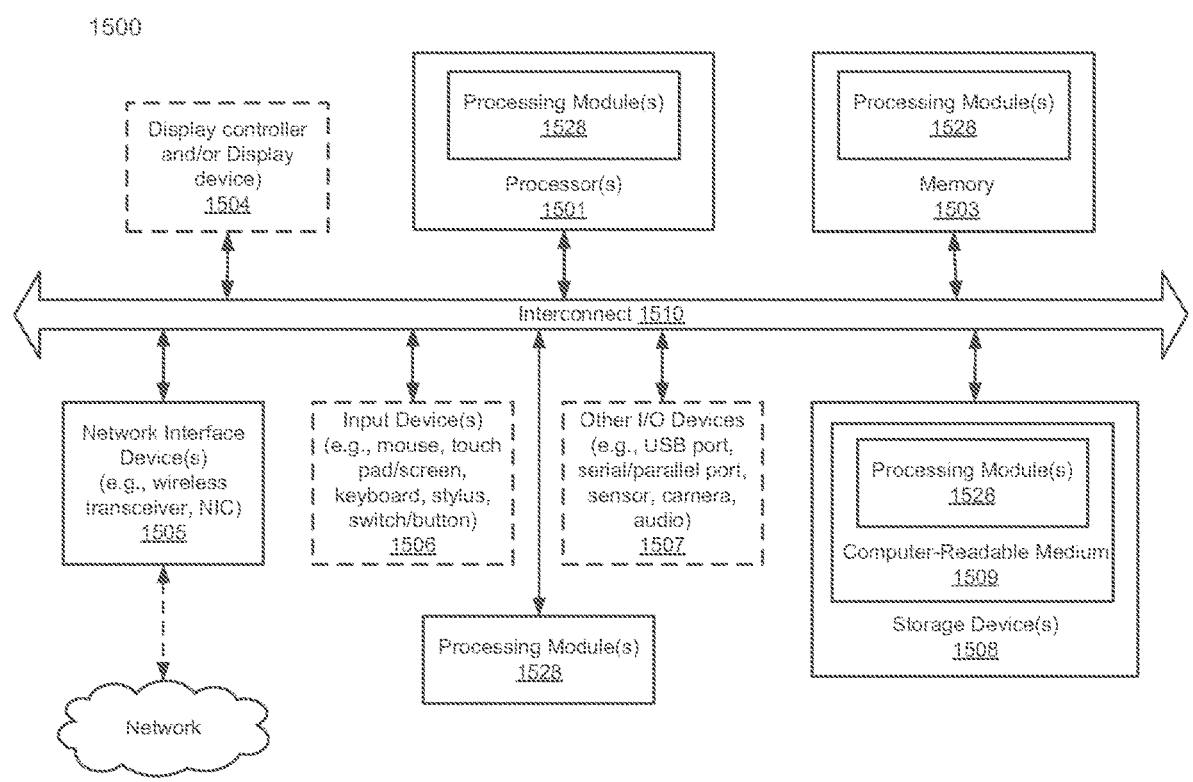
FIG. 12 is a block diagram illustrating a data processing system according to one embodiment.

FIG. 12 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, control module 305 or machine learning engine 122. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for controlling a speed of an autonomous vehicle, the method comprising:
   calculating, by one or more processors, a first torque force for accelerating the autonomous vehicle to autonomously maneuver the autonomous vehicle, including:
      determining a first speed representing a target speed of the autonomous vehicle to maneuver the autonomous vehicle at a first reference time,
      determining a second speed representing a target speed of the autonomous vehicle to maneuver the autonomous vehicle at a second reference time; and
      calculating the first torque force based on the first and second speeds in view of a throttle control command delay;
   converting the first torque force into a throttle command, wherein the throttle command is based at least on the first torque force and the throttle control command delay, wherein the throttle control command delay is longer than a brake control command delay;
   calculating, by the one or more processors, a second torque force for maintaining a constant speed of the autonomous vehicle;
   determining, by the one or more processors, a throttle-brake torque force based on the first torque force and second torque force; and
   controlling, by the one or more processors, a subsequent speed of the autonomous vehicle based on the throttle-brake torque force.

2. The method of claim 1, wherein calculating the first torque force based on the first and second speeds comprises:
   calculating a speed difference between the first speed and the second speed; and
   dividing the speed difference by a time difference between the first reference time and the second reference time.

3. The method of claim 1, wherein calculating the second torque force comprises:
   determining a current speed of the autonomous vehicle;
   determining a frictional force acting on the autonomous vehicle;
   determining a wind resistance acting on the autonomous vehicle; and
   calculating the second torque force required to maintain the current speed of the autonomous vehicle based on the current speed, the frictional force, and the wind resistance.

4. The method of claim 3, wherein the wind resistance is determined based on a second order of the current speed, wherein the frictional force is determined based on a first order of the current speed.

5. The method of claim 1, further comprising calculating a third torque force to minimize a speed difference between an actual speed and a target speed of the autonomous vehicle, wherein the throttle-brake torque force is determined further based on the third torque force.

6. The method of claim 5, wherein calculating the third torque force comprises:
   determining the target speed of an autonomous vehicle;
   determining the actual speed of the autonomous vehicle; and
   calculating the third torque force required to minimize the speed difference between the target speed and actual speed using a proportional-integral-derivative (PID) controller.

7. The method of claim 5, wherein calculating the throttle-brake torque force comprises summing the first, second, and third torque forces.

8. A non-transitory machine-readable medium having instructions stored therein, which when executed by a processor, cause the processor to perform operations of operating an autonomous vehicle, the operations comprising:
   calculating a first torque force for accelerating the autonomous vehicle to autonomously maneuver the autonomous vehicle, including:
      determining a first speed representing a target speed of the autonomous vehicle to maneuver the autonomous vehicle at a first reference time:
      determining a second speed representing a target speed of the autonomous vehicle to maneuver the autonomous vehicle at a second reference time; and
      calculating the first torque force based on the first and second speeds in view of a throttle control command delay;
   converting the first torque force into a throttle command, wherein the throttle command is based at least on the first torque force and the throttle control command delay, wherein the throttle control command delay is longer than a brake control command delay;
   calculating a second torque force for maintaining a constant speed of the autonomous vehicle;
   determining a throttle-brake torque force based on the first torque force and second torque force; and
   controlling a subsequent speed of the autonomous vehicle based on the throttle-brake torque force.

9. The non-transitory machine-readable medium of claim 8, wherein calculating the first torque force based on the first and second speeds comprises:
   calculating a speed difference between the first speed and the second speed; and
   dividing the speed difference by a time difference between the first reference time and the second reference time.

10. The non-transitory machine-readable medium of claim 8, wherein calculating the second torque force comprises:
   determining a current speed of the autonomous vehicle;
   determining a frictional force acting on the autonomous vehicle;

determining a wind resistance acting on the autonomous vehicle; and calculating the second torque force required to maintain the current speed of the autonomous vehicle based on the current speed, the frictional force, and the wind resistance.

11. The non-transitory machine-readable medium of claim 10, wherein the wind resistance is determined based on a second order of the current speed, wherein the frictional force is determined based on a first order of the current speed.

12. The non-transitory machine-readable medium of claim 8, wherein the operations further comprise calculating a third torque force to minimize a speed difference between an actual speed and a target speed of the autonomous vehicle, wherein the throttle-brake torque force is determined further based on the third torque force.

13. The non-transitory machine-readable medium of claim 12, wherein calculating the third torque force comprises:

determining the target speed of an autonomous vehicle;
determining the actual speed of the autonomous vehicle; and
calculating the third torque force required to minimize the speed difference between the target speed and actual speed using a proportional-integral-derivative (PID) controller.

14. The non-transitory machine-readable medium of claim 12, wherein calculating the throttle brake torque force comprises summing the first, second, and third torque forces.

15. A data processing system, comprising:

a processor; and
a memory coupled to the processor to store instructions, which when executed by the processor, cause the processor to perform operations of operating an autonomous vehicle, the operations including:
calculating a first torque force for accelerating the autonomous vehicle to autonomously maneuver the autonomous vehicle, including;
determining a first speed representing a target speed of the autonomous vehicle to maneuver the autonomous vehicle at a first reference time,
determining a second speed representing a targets peed of the autonomous vehicle to maneuver the autonomous vehicle at a second reference time, and
calculating the first torque force based on the first and second speeds in view of a throttle control command delay, converting the first torque force into a throttle command, wherein the throttle command is based at least on the first torque force and the throttle control command delay, wherein the throttle control command delay is longer than a brake control command delay, calculating a second torque force for maintaining a constant speed of the autonomous vehicle,
determining a throttle-brake torque force based on the first torque force and second torque force, and
controlling a subsequent speed of the autonomous vehicle based on the throttle-brake torque force.

16. The system of claim 15, wherein calculating the first torque force based on the first and second speeds comprises:

calculating a speed difference between the first speed and the second speed; and
dividing the speed difference by a time difference between the first reference time and the second reference time.

17. The system of claim 15, wherein calculating the second torque force comprises:

determining a current speed of the autonomous vehicle;
determining a frictional force acting on the autonomous vehicle;
determining a wind resistance acting on the autonomous vehicle; and
calculating the second torque force required to maintain the current speed of the autonomous vehicle based on the current speed, the frictional force, and the wind resistance.

18. The system of claim 17, wherein the wind resistance is determined based on a second order of the current speed, wherein the frictional force is determined based on a first order of the current speed.

19. The system of claim 15, wherein the operations further comprise calculating a third torque force to minimize a speed difference between an actual speed and a target speed of the autonomous vehicle, wherein the throttle-brake torque force is determined further based on the third torque force.

20. The system of claim 19, wherein calculating the third torque force comprises:

determining the target speed of an autonomous vehicle;
determining the actual speed of the autonomous vehicle; and
calculating the third torque force required to minimize the speed difference between the target speed and actual speed using a proportional-integral-derivative (PID) controller.

21. The system of claim 19, wherein calculating the throttle-brake torque force comprises summing the first, second, and third torque forces.

* * * * *